United States Patent
Potti Cuervo et al.

(10) Patent No.: US 8,388,351 B2
(45) Date of Patent: Mar. 5, 2013

(54) ARTICULATED KNEE FOR ARTHROSCOPY SIMULATION

(75) Inventors: Jorge Potti Cuervo, Madrid (ES); Carlos Guillermo Illana Alejandro, Madrid (ES); Bernardo Sierra Picon, Madrid (ES)

(73) Assignee: Simbionix Ltd., Airport City (IL)

( * ) Notice: Subject to any disclaimer, the term of this patent is extended or adjusted under 35 U.S.C. 154(b) by 260 days.

(21) Appl. No.: 12/991,509

(22) PCT Filed: May 6, 2008

(86) PCT No.: PCT/ES2008/000311
§ 371 (c)(1),
(2), (4) Date: Dec. 16, 2010

(87) PCT Pub. No.: WO2009/135956
PCT Pub. Date: Nov. 12, 2009

(65) Prior Publication Data
US 2011/0097696 A1 Apr. 28, 2011

(51) Int. Cl.
*G09B 23/28* (2006.01)
(52) U.S. Cl. ........................................ 434/274
(58) Field of Classification Search .............. 434/262, 434/267, 274, 275; 73/866.4; 623/39
See application file for complete search history.

(56) References Cited

U.S. PATENT DOCUMENTS

| | | | | |
|---|---|---|---|---|
| 4,000,564 A * | 1/1977 | Haffner et al. | ................. | 434/274 |
| 4,276,032 A * | 6/1981 | Woley et al. | ................... | 434/274 |
| 4,349,339 A * | 9/1982 | Daniel | .......................... | 434/274 |
| 4,433,961 A * | 2/1984 | Chandler | ....................... | 434/274 |
| 4,605,373 A | 8/1986 | Rosen | ............................ | 434/274 |
| 4,802,858 A * | 2/1989 | Lindskog et al. | .............. | 434/274 |
| 4,850,877 A * | 7/1989 | Mason et al. | .................. | 434/274 |
| 5,873,734 A * | 2/1999 | Griswold et al. | ............. | 434/274 |
| 5,967,790 A * | 10/1999 | Strover et al. | ................. | 434/274 |
| 7,384,268 B2 * | 6/2008 | Browne-Wilkinson | ....... | 434/274 |
| 7,699,615 B2 * | 4/2010 | Sakezles | ....................... | 434/274 |
| 8,108,190 B2 * | 1/2012 | Riener et al. | .................... | 703/11 |
| 2007/0212672 A1 | 9/2007 | McAllister et al. | ........... | 434/274 |
| 2008/0021570 A1 * | 1/2008 | Bedard et al. | ................... | 623/40 |

FOREIGN PATENT DOCUMENTS

| | | |
|---|---|---|
| DE | 41 17 046 | 11/1991 |
| EP | 1 205 295 | 5/2002 |
| WO | WO 97/33263 | 9/1997 |
| WO | WO 98/59332 | 12/1998 |

(Continued)

OTHER PUBLICATIONS

International Search Report dated Feb. 6, 2009.

(Continued)

*Primary Examiner* — Kurt Fernstrom
(74) *Attorney, Agent, or Firm* — Pearl Cohen Zedek Latzer, LLP

(57) ABSTRACT

The present disclosure relates to an articulated knee for arthroscopy simulation that allows true-to-life training. The articulated knee includes an articulation mechanism provided with a framework for coupling to a simulator, and angular and lateral articulation means, traction means and means for quantifying these movements, as well as means that allow force feedback, not only in the movements achieved along each of the axes of rotation and traction of the knee but also the movements achieved by the rods connected to the haptic devices, which are introduced through the entry portals, simulating the surgical instrument.

12 Claims, 7 Drawing Sheets

FOREIGN PATENT DOCUMENTS

| WO | WO 99/42978 | 8/1999 |
|---|---|---|
| WO | WO 03/001483 | 1/2003 |
| WO | WO 2004/064010 | 7/2004 |

OTHER PUBLICATIONS

A. McCarthy et al., "Passive Haptics in a Knee Arthroscopy Simulator; Is it Valid for Core Skills Training?", *Clinical Orthopaedics and Related Research*, 442:13-20 (2006).

I.P. Logal et al., "Virtual Environment Knee Arthroscopy Training System", *Simulation for Emergency Management. Proceedings of the 1996 Simulation Multiconference*, pp. 11-16 (1996).

S. Gibson et al., "Simulating Arthroscopic Knee Surgery Using Volumetric Object Representations, Real-Time Volume Rendering and Haptic Feedback", *CVRMed-MRCAS'97 First Joint Conference, Computer vision, virtual Reality and Robotics in Medicine and Medical Robotics and Computer-Assisted Surgery Proceedings*, pp. 369-378 (1997).

"Virtual Reality Arthroscopy Trainer. Technological Innovation for Minimally Invasive Surgery Training", *GMV Innovating Solutions*, (2008).

Supplementary European Search Report for European App. No. EP 08 76 1556 dated Oct. 30, 2012.

* cited by examiner

ARTICULATED KNEE FOR ARTHROSCOPY SIMULATION

CROSS REFERENCE TO RELATED APPLICATIONS

The present application is a 35 U.S.C. §371 National Phase conversion of PCT/ES2008/000311, filed May 6, 2008, the disclosure of which is incorporated herein by reference. The PCT International Application was published in the Spanish language.

OBJECT OF THE INVENTION

As expressed in the title, the invention relates to an articulated knee for arthroscopy simulation which, due to its true-to-life and realistic nature, is a powerful training tool for performing this type of surgical operations.

More specifically, the articulated knee of the invention is able to faithfully reproduce all the movements of a real knee, which furthermore provides force reaction as if the user were dealing with an actual operation, all aided by a virtual system completing the simulation.

BACKGROUND OF THE INVENTION

For several decades now there have been various techniques in the field of surgery which seek to heal the patient through interventions which, in contrast with those referred to as open surgery, do not require giving the patient a large incision in order to act on the affected organs, thus allow rapid patient recovery, shorter hospitalization time and a lower risk for infections.

One of these techniques, which are usually comprised within the term "minimal invasion" or "minimally invasive surgery", is arthroscopic surgery, which consists of performing surgical interventions without opening the patient up, making only a small incision referred to as portal, through which the instrument required for operating on a certain organ: bone, muscle, ligaments, etc., normally located in joints, will enter.

However, even though these types of operations have many advantages, they make it necessary for the medical staff that will be performing the intervention to be thoroughly prepared.

For this reason, and in order to achieve true-to-life training, a number of mechanical and/or virtual models have emerged which seek to train said medical staff as best possible so that these types of operations can be subsequently approached successfully.

These simulators, however, suffer the drawbacks of not being able to faithfully reproduce each and every one of the possible movements that the surgeon later needs to perform on the patient to carry out the intervention, such as for example the lateral movement referred to as varus-valgus movement when the leg of the patient is flexed, which is impossible to do if the leg is extended, traction or distension movement, or even mere articular movement.

Furthermore, said simulators in most cases are also not able to assess force exerted by the surgeon, or to feed back in the haptic devices that the surgeon handles the opposition exerted by the internal organs of the patient, so it is impossible to determine if the training is being performed suitably, or in other words, if said surgeon is appropriately learning the different techniques which will later be necessary to carry out in the intervention on the patient.

Even though other simulators reproduce therein the articular structure corresponding to the femur and the tibia, they have the drawback of said articulation occupying a large part of the cavity, leaving no free space therein for the movement of the haptic instrument, and therefore, they are unable to faithfully reproduce the conditions of a real arthroscopic operation.

U.S. Pat. No. 4,605,373 is known, describing a training device for handling fractured limbs by quantifying the movements applied to the leg. However, the inner part of the joint is not hollow and is not designed for the interior to be examined virtually, but rather for only evaluating the movements applied from the outside. It does not limit the varus-valgus movement and does not transmit force reactions.

Finally, patent US 2004/0254771 A1 describes a joint simulator which physically simulates various structures of the knee but it does not allow the penetration of instruments for simulating arthroscopic operations. Both the movements and the reflection of forces occur due to external actuators (robotic arm linked to the articulation) and not due to the articulation mechanism itself.

DESCRIPTION OF THE INVENTION

The articulated knee for arthroscopy simulation proposed by the present invention resolves the aforementioned drawbacks, since it allows a true-to-life training, faithfully reproducing both the possible movements to which the surgeon will subject the knee, and the force feedback that the surgeon will notice in the real intervention when handling the different organs and tissues of the patient.

Thus, the articulated knee of the invention comprises an articulation mechanism which allows said knee to have flexion-extension and varus-valgus movements, force reaction for each movement and means for quantifying the tractive force and the displacement in each movement of the knee.

More specifically, through the articulation mechanism, the articulated knee of the present invention comprises the following means:

Angular, i.e., flexion, articulation means of the knee.

Lateral articulation means of the knee which allow lateral varus-valgus movements when the leg is not straight, i.e., in any articulation range.

Locking means to prevent lateral varus-valgus movements when the leg is extended, just as the human anatomy reacts.

Means for extension to allow distension, i.e., traction, movement of the interchondral cavity.

Means for quantifying each of the previous movements which allow measuring the linear or angular length displaced in said movements; and Force feedback means, both in the movements achieved along each of the axes of rotation and traction of the knee and in the movements achieved by the haptic devices introduced through the entry portals, carriers of the surgical instrument.

Furthermore, all these movements are quantified and processed in a central processing unit or CPU which has different simulation software modules that are able to graphically reproduce on a screen the movements and manipulations performed by the user, to manage a library of images and scenarios based on which the simulation takes place and based on which the user interacts virtually, as well as to store and manage all the data generated during the simulation, etc.

Finally, the entire haptic simulation is performed as a result of the fact that the knee of the invention is hollow, which facilitates the entry and manipulation of the surgical instrument associated with haptic devices which allow force feedback, generating the different touch sensations such as hardness of the bone organs, elasticity of the ligaments, etc., making the simulation completely realistic.

DESCRIPTION OF THE DRAWINGS

To complement the description being made and for the purpose of aiding to better understand the features of the invention, a set of drawings is attached to the present description as an integral part thereof in which the following is shown with an illustrative and non-limiting character.

PREFERRED EMBODIMENT OF THE INVENTION

According to a possible embodiment of the invention shown in the figures, the articulated knee of the invention generally comprises an anatomical model or knee (24) per se which represents the lower part of a leg, just below the knee and which is hollow, to which an articulation mechanism (1) is coupled in its upper part.

Figure 10:
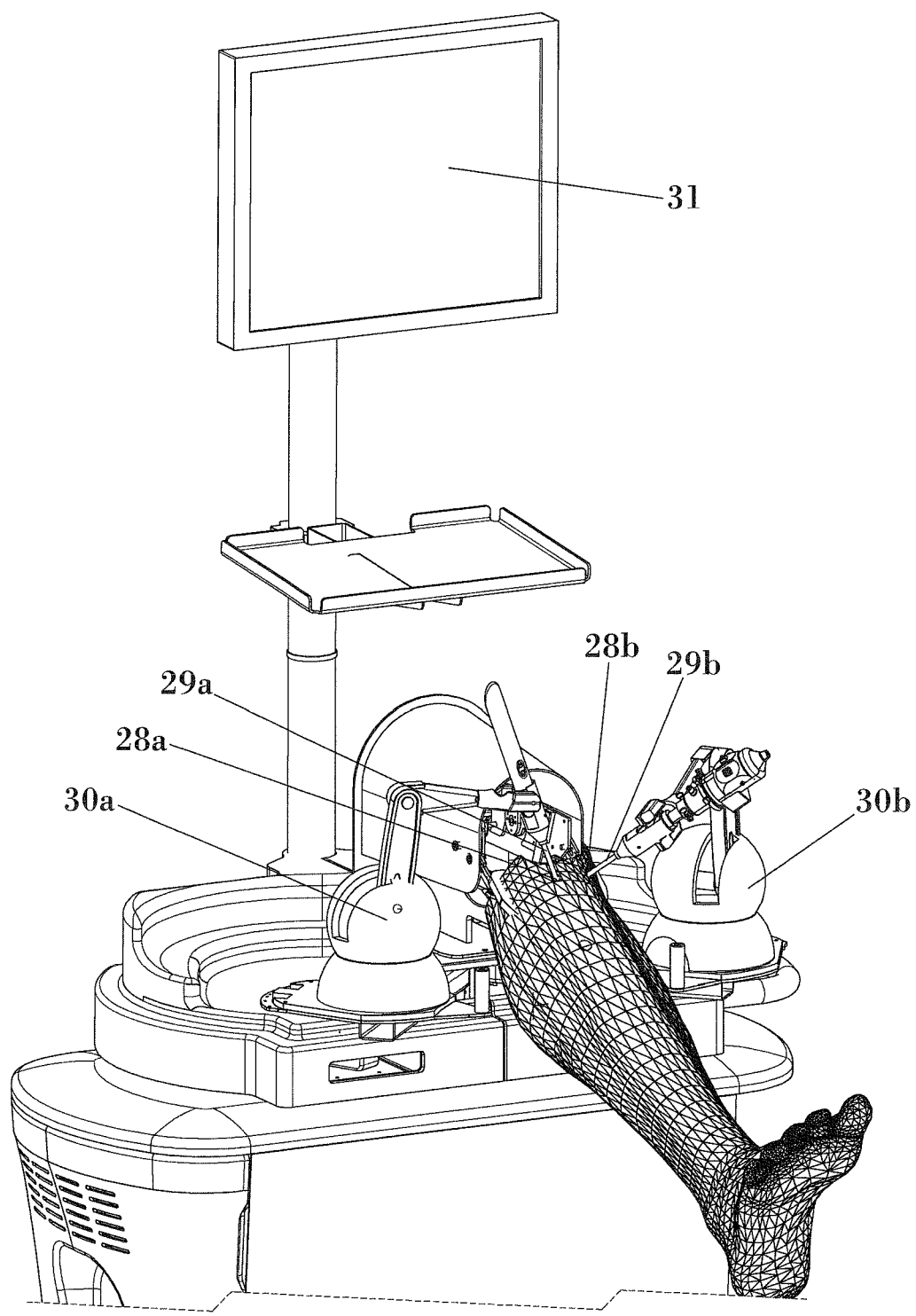
FIG. 10 shows a perspective view of the entire arthroscopy simulation assembly to which the knee of the present invention is coupled.

This articulation mechanism (1), capable of being coupled to a virtual reality simulator, as can be seen in FIG. 10, which has all the elements necessary for performing a complete simulation, training the user.

Therefore, as if it were a real knee, the anatomical model or knee (24) of the invention allows performing, through said articulation mechanism (1) and as can be observed in FIGS. 1 to 6, angular, i.e., flexion and extension, articulation movements in varying degrees, lateral, i.e., varus or valgus, articulation movements, and extension or traction movements.

However, even though this articulation mechanism (1) allows performing all these movements, it neither prevents nor hinders the use of haptic devices (30a, 30b) and their corresponding instrument simulated by means of rods (29a, 29b) introduced through the portals (28a, 28b) provided in said knee (24) for achieving a true-to-life simulation.

Figure 7:
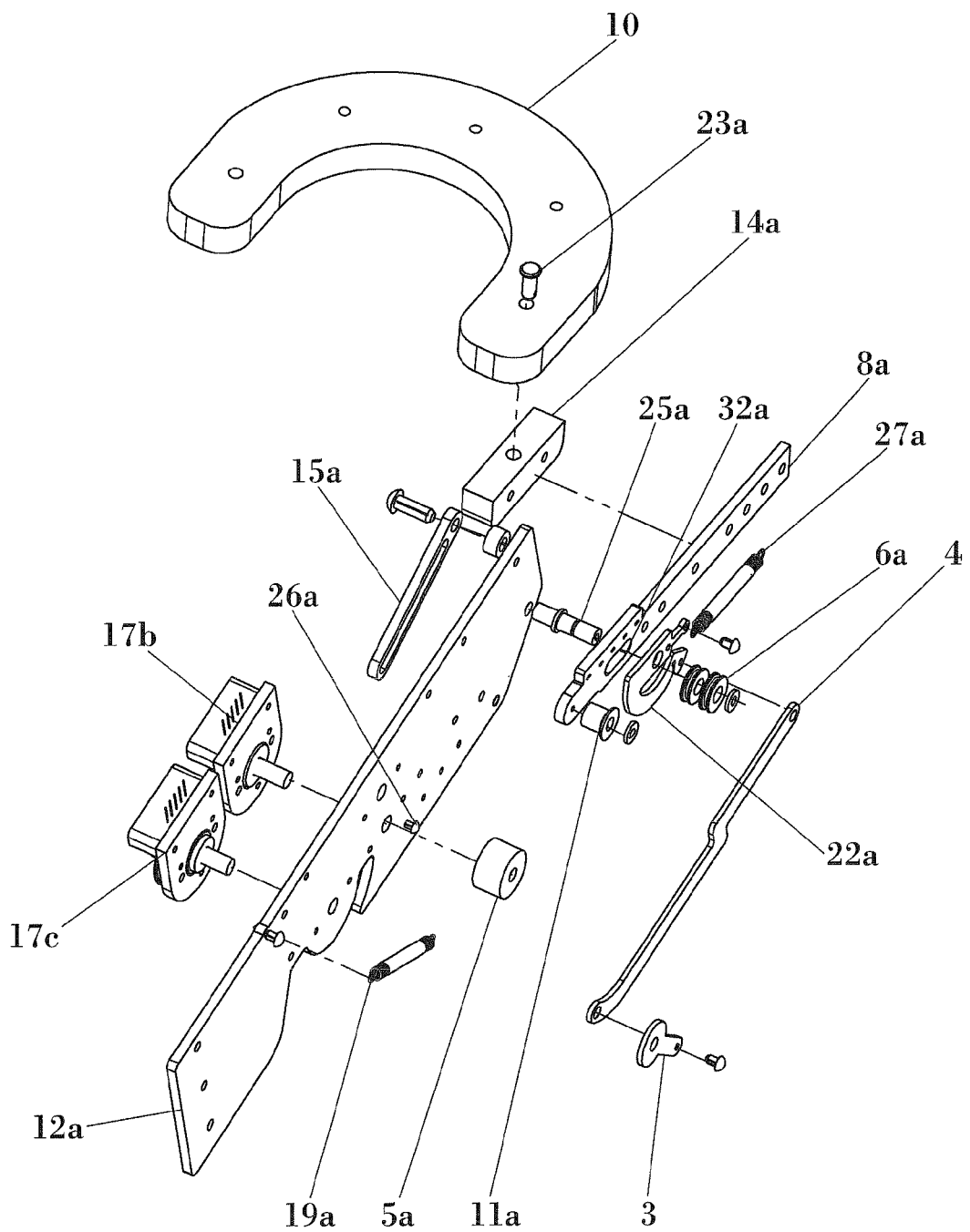
FIG. 7 shows an exploded view of the articulation mechanism of the knee of the invention.
Figure 8:
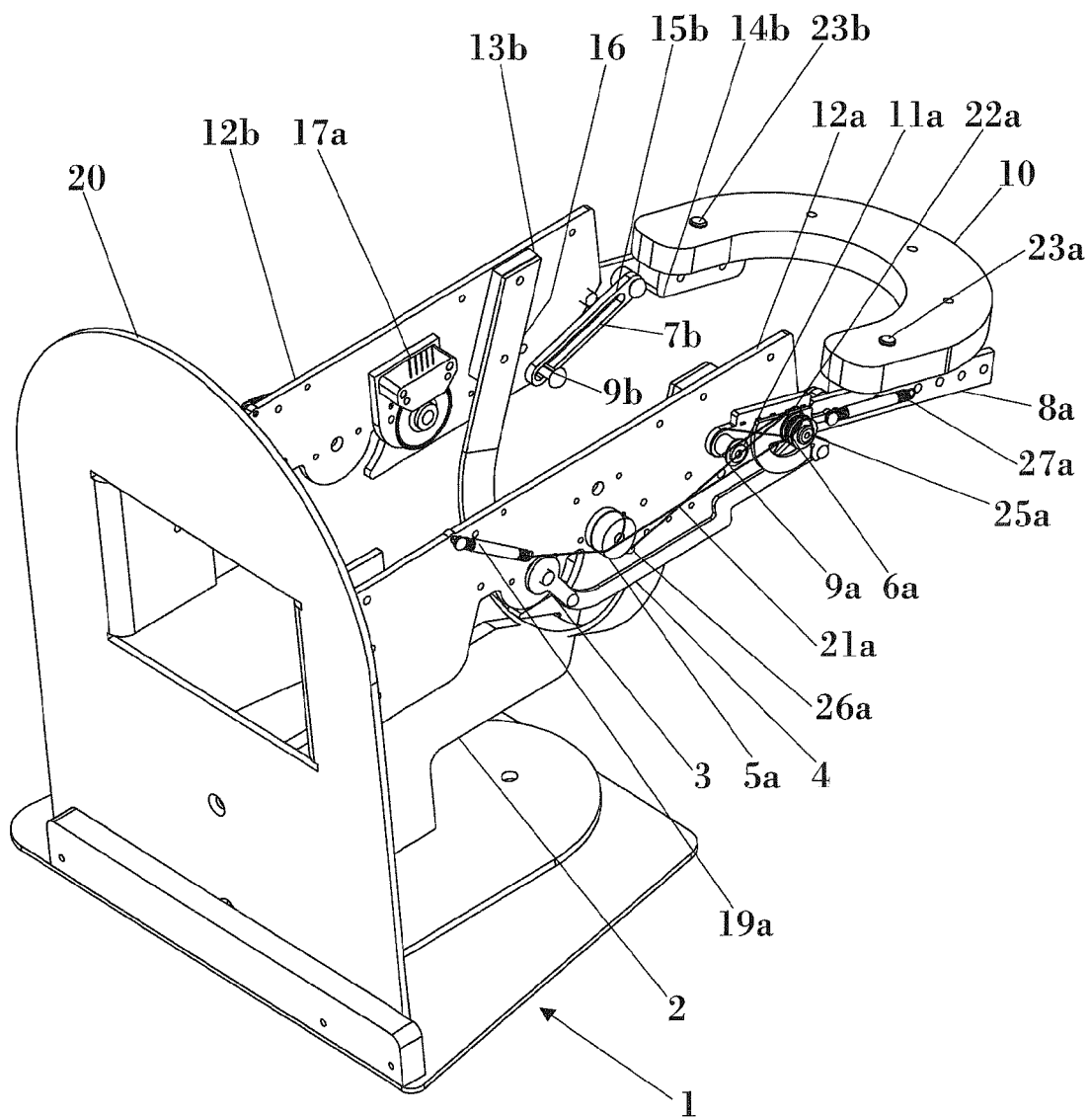
FIGS. 8 and 9 show respective upper side and lower side perspective views, respectively, of the entire articulation mechanism of the knee of the present invention.
Figure 9:
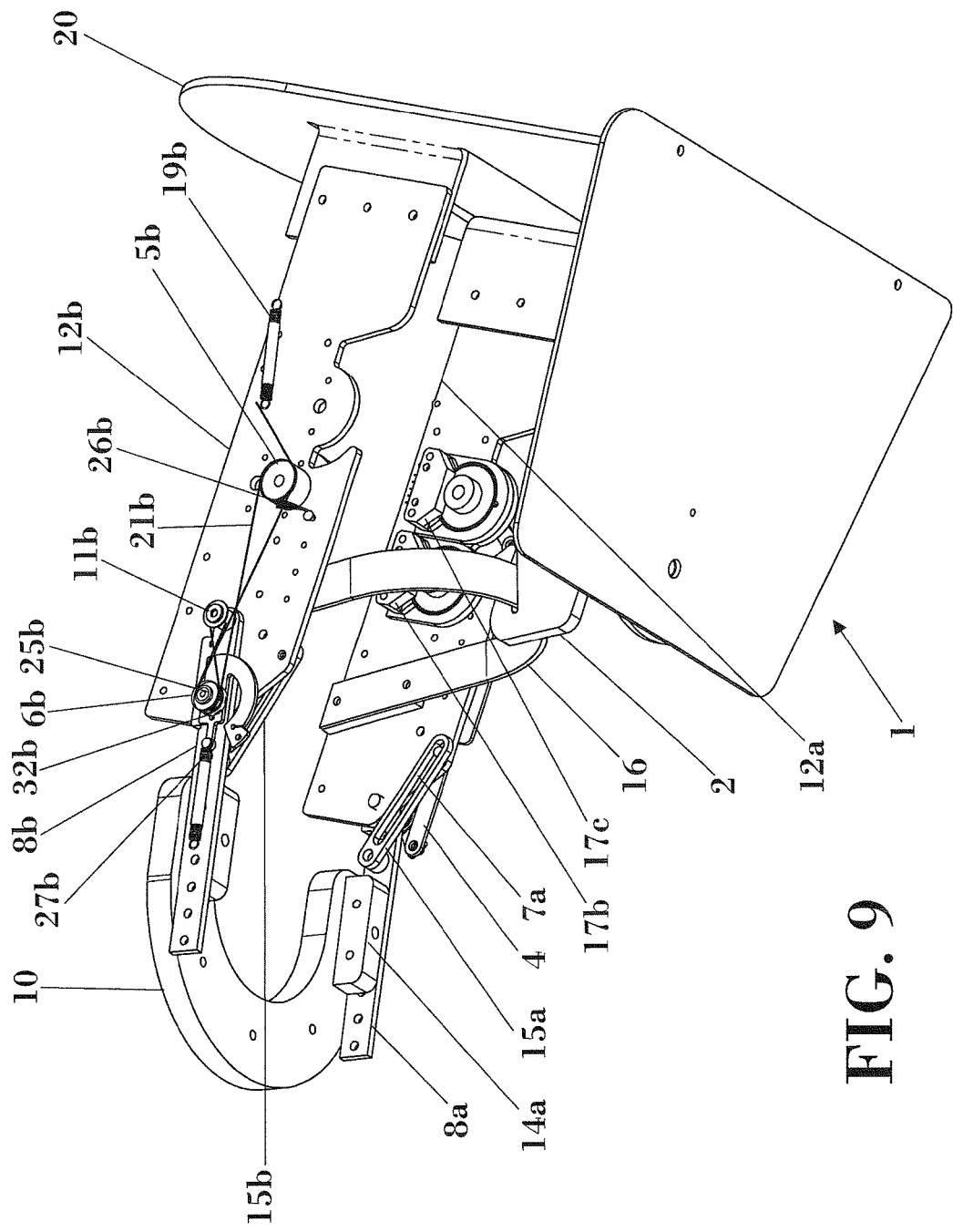

To that end, the articulation mechanism (1), which is provided in the upper part of the knee (24), and as can be seen in FIGS. 7 to 9, comprises a frame (20), with means for being coupled to the simulator, on which two mechanism support plates (12a and 12b) are anchored, being connected to one another and by means of the interposition of respective fixing parts (13a) and (13b), by a bridge (16) which carries out the functions for the parallelism and support of both plates (12a and 12b). Said bridge (16), which has a downwardly curved configuration, is supported in its central area on a flat bar (2) in solidarity with the frame (20), providing mechanical rigidity to the structure.

Coupled to the distal ends of said plates (12a) and (12b) there are respective sliding parts (8a) and (8b) which in turn are connected to a central rocker arm (10) forming the link in solidarity with the body of the knee (24), said slides (8a) and (8b) having at their ends connecting them to the plates (12a) and (12b) parts (22a) and (22b) which swing between shafts (25a) and (25b), the first of which (22a), provided in the plate (12a), is coupled to a connecting rod (4) which will transmit the movement of the body of the knee (24), as explained below.

Therefore, with regard to the angular articulation means of the knee and the quantification thereof, i.e., those which allow the flexion-extension movement and the measurement or quantification thereof, it generally, and according to a possible embodiment of the invention, shown in FIGS. 7, 8 and 9, comprises at least one angular movement reader (17c), preferably an encoder, housed in the mechanism support plate (12a), such that each flexion movement of the knee (24) is transmitted to the connecting rod (4), to the lever (3) provided at the opposite end of the connecting rod (4), such that the rotation is received by said angle reader (17c) and the latter sends the position to the CPU of the simulator in order to be processed.

More specifically, the rocker arm (10) is articulated vertically, simulating the flexion of the knee (24), acting on the shafts (25a and 25b) and rotating the part (22a) to transmit said rotation, by means of the connecting rod (4), to the angle reader (17c), the function of which consists of supplying the CPU with the degree of rotation of the knee (24) for the virtual representation of movements of the internal structures thereof, together with their haptic representation, as well as the force feedback produced by said flexion movement.

With regard to the extension and lateral articulation means of the knee, i.e., those which allow both lateral varus-valgus movements and traction movements of the interchondral cavity and means for quantifying them, it generally, and according to a possible embodiment of the invention, shown in FIGS. 7, 8 and 9, comprises at least respective angular movement readers (17a, 17b) located in the mechanism support plates (12b, 12a) respectively for measuring both the displacement produced by a traction that may occur in the knee (24), such as the deviation or lateral or varus-valgus movements.

Thus, both for producing and for quantifying these two movements, both lateral and traction movements, in the knee (24), as described, such knee is fixed to the rocker arm (10) in solidarity such that both elements, body (24) and rocker arm (10), will move with the same angle, said rocker arm (10) pivoting in the shafts (23a and 23b) on the runners (14a and 14b) respectively, which in turn are connected to the mentioned slides (8a) and (8b).

More specifically, for quantifying the movements according to a preferred embodiment, the angular movement reader (17a) measures the valgus movement, while the angular movement reader (17b) measures the varus movement. In contrast, when the angle readers (17a) and (17b) act at the same time, it means that the knee is being extended, i.e., that the condyles are separating. In the event that the separation measured in each one is not the same, this will mean that in addition to the extension itself, a valgus or varus movement will be produced, depending on if the inner or outer condyle predominates.

Furthermore, for quantifying said movements, both lateral or varus-valgus and traction movements, there is also a cable (21a) and (21b) in each of the plates (12a) and (12b) anchored, respectively, to one end of an elastic element, such as a spring (19a) and (19b), for example, provided for such purpose, following its path to a sheave (5a) and (5b), turning around the latter, and, fixed in a point thereof, continuing its path, passing through a pair of sheaves (6a) and (6b), following through an idler sheave (11a) and (11b), returning from there to the pair of sheaves (6a) and (6b), and ending up lashed in an anchoring point (26b) provided for such purpose in the plate (12a) and (12b).

The functionality of said cable is the following: for example, upon moving the slide (8b) provided with another elastic element, such as an antagonistic spring (27b), for example, it is driven by the rocker arm (10), when the knee (24) is manipulated, in this case a valgus movement, it results in the approximation of the sheave (11b) to the shaft (25b) and therefore the spring (19b) draws in the cable (21b), making the sheave (5b) rotate, changing the position of the angle reader (17b).

On the other hand, the rocker arm (10) is articulated horizontally from the shafts (23a and 23b) independently, such that left-hand, right-hand rotation (varus-valgus) or traction (articular extension of the knee) movements can be performed. In the case of the latter, traction movements, the slides (8a) and/or (8b) act, being displaced in the main shaft (25a) and/or (25b), limited by and led through the window (32a) and (32b), aided by their respective elastic elements, such as springs (27a) and (27b), for example, according to the resultant of the displacement. Said springs (27a) and (27b) simulate the force reaction to joint stress, similar to the human anatomy.

All these movements are transmitted by means of the respective cables (21a, 21b) for being quantified by the corresponding angle readers (17a, 17b), sent to the CPU, analyzed, processed, etc., for the purpose of both generating the corresponding simulation scenarios and their display on the screen (31), and for their storage in the system for the purpose of generating the subsequent analyses or reports with which the simulation being conducted is evaluated.

Figure 1:
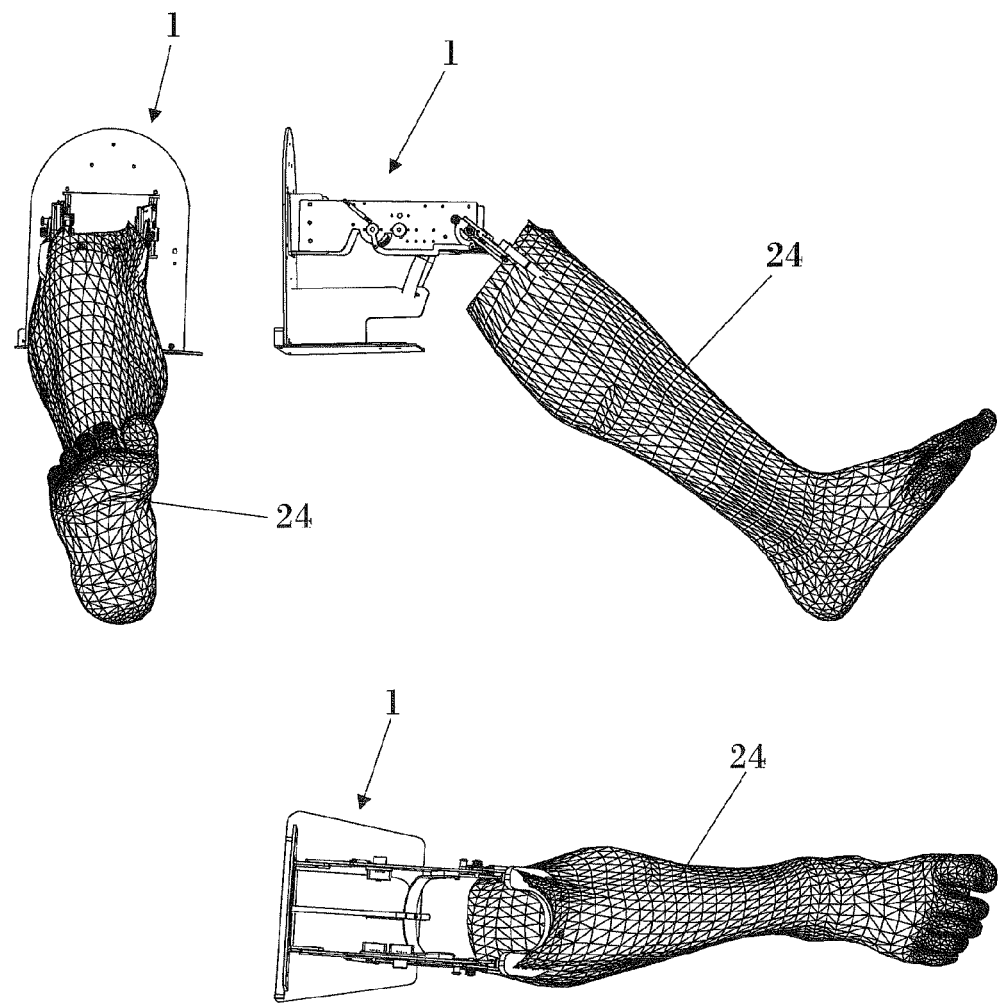
FIG. 1 shows elevation, plan and profile views of an embodiment of an articulated knee for arthroscopy simulation according to the invention when the latter is flexed 45°.
Figure 2:
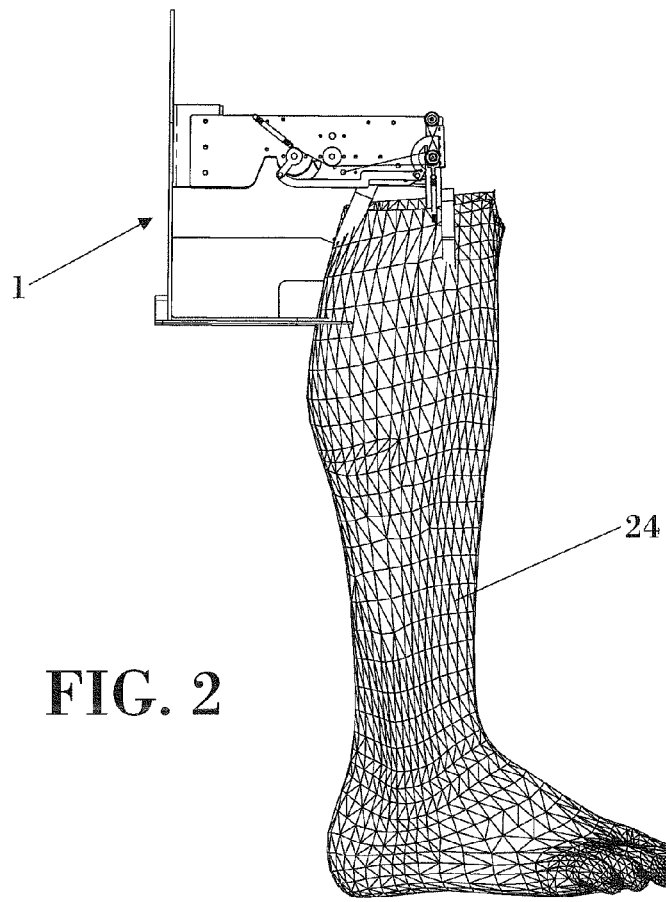
FIG. 2 shows a side view of the knee of the invention when the latter is flexed 90°.
Figure 3:
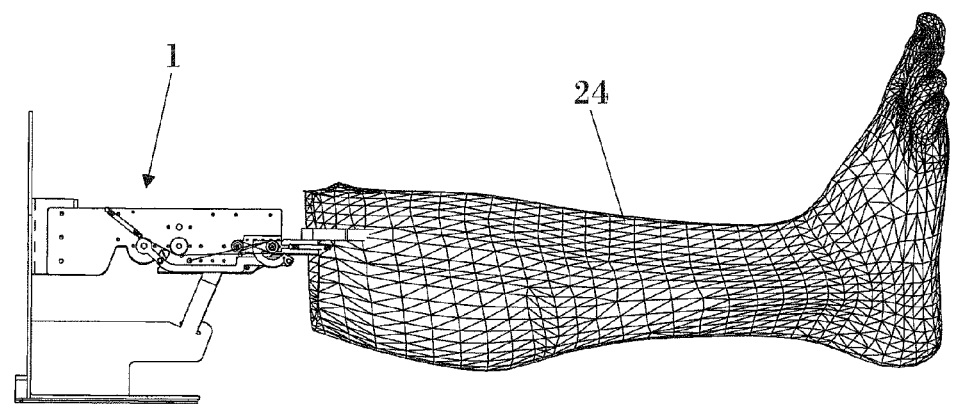
FIG. 3 shows a side view of the knee of the invention when the latter is completely extended.
Figure 4:
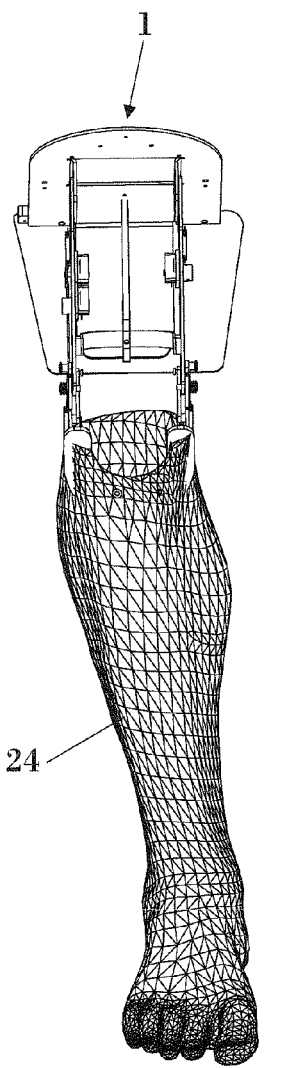
FIG. 4 shows a perspective view of the knee of FIG. 2 when the latter has been laterally displaced, in varus position.
Figure 5:
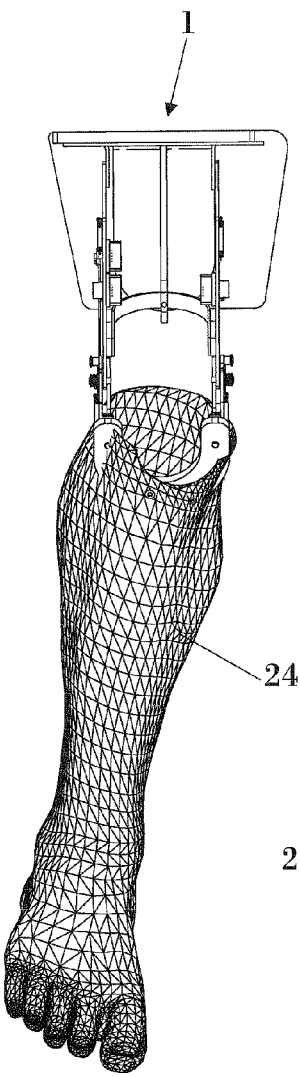
FIG. 5 shows a perspective view of the knee of FIG. 2 when the latter has been laterally displaced, in valgus position.
Figure 6:
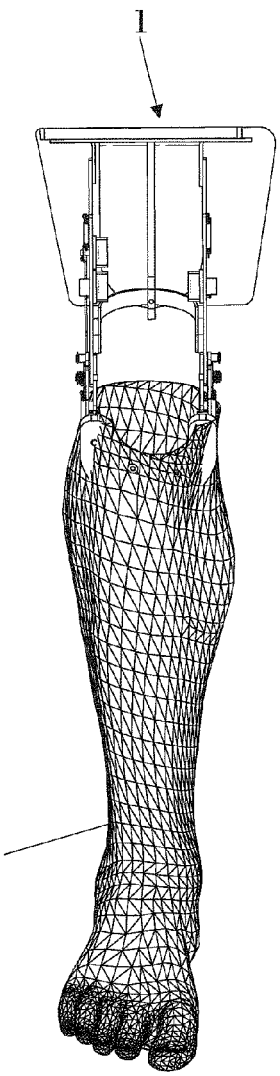
FIG. 6 shows a perspective view of the knee of FIG. 2 when the latter is in the straight position.

Furthermore and as previously mentioned, the articulation and/or extension movements can be simultaneous only when the knee (24) is flexed. However, if said knee (24) is completely stretched out or extended in the straight position, as shown in FIG. 3, the articulation mechanism (1) will not allow any lateral or extension movement of the knee (24), corresponding with the real behavior of the human anatomy.

Thus, the locking means to prevent lateral varus-valgus movements when the leg is extended, comprise, according to a possible embodiment of the invention, grooved connecting rods (15a and 15b) limiting the angular and linear course of their respective slides (8a and 8b) when in the window (7a) and (7b) they are at the end of their course and abut against the shaft (9a) and (9b).

Finally, FIG. 10 depicts a practical application of the articulated knee of the invention coupled to a simulator provided with its corresponding display screen (31), together with the haptic devices (30a and 30b) which support or integrate the instrument simulated by the rods (29a) and (29b), which are introduced through the portals (28a and 28b) provided in the body of the knee (24) for the haptic simulation.

As also previously stated, the introduction of the instrument simulated by the haptic devices (30a and 30b) is possible since the articulation mechanism (1) of the knee of the invention is structured such that the interior thereof is hollow, preventing mechanical interference.

It should be indicated, as previously stated, that the rocker arm (10) supports the anatomical model to be simulated in virtual reality, in this case a leg with a knee model (24), as the simulator is for training in arthroscopy. However, in other possible embodiments of the invention, said element can be configured as a foot, instead of said knee (24), as the anatomical model for the virtual representation of the joints of the ankle, or of a hand, as a model for representing the wrist, etc., as well as any other joints capable of being articulated and/or subjected to traction.

What is claimed is:

1. An articulated knee for arthroscopy simulation, wherein the articulation mechanism comprises:
   angular or flexion articulation means;
   lateral or varus-valgus articulation means;
   means for extension or traction of the interchondral cavity;
   locking means to prevent the lateral varus-valgus movements when the leg is extended; and
   means for quantifying each of the previous movements which allow measuring the linear or angular length displaced in said movements.

2. An articulated knee for arthroscopy simulation according to claim 1, wherein the means for quantifying the angular or flexion movements comprise at least one angle reader.

3. An articulated knee for arthroscopy simulation according to claim 2, wherein the angular or flexion movements are transmitted to the angle reader by means of a connecting rod which transmits the movement of a part rotating in solidarity with a shaft on which a rocker arm to which the knee is connected in solidarity acts.

4. An articulated knee for arthroscopy simulation according to claim 1, wherein the means for quantifying the lateral or varus-valgus articulation movements and the extension or traction articulation movements comprise at least two angular movement readers.

5. An articulated knee for arthroscopy simulation according to claim 4, wherein one angular movement reader measures the valgus movement and the other angular movement reader measures the varus movement such that it can be quantified if only an extension, only a varus or valgus movement or a combination of simultaneous extension and varus or valgus movement occurs.

6. An articulated knee for arthroscopy simulation according to claim 4, wherein the two angular movement readers are each located on one of the two mechanism support plates.

7. An articulated knee for arthroscopy simulation according to claim 4, wherein it comprises in each of the plates a cable anchored at one end to an elastic element and at the other end to an anchoring point, respectively, which, in its path, passes through at least one sheave the shaft of which is associated with the corresponding angular movement reader such that it can quantify the movement of knee.

8. An articulated knee for arthroscopy simulation according to claim 1, wherein the means for extension or traction comprise respective slides, capable of being displaced, which are aided by respective elastic elements and simulating the force reaction to the joint stress.

9. An articulated knee for arthroscopy simulation according to claim 1, wherein the locking means to prevent the lateral varus-valgus movements when the leg is extended comprise grooved connecting rods limiting the angular and linear course of their respective slides.

10. An articulated knee for arthroscopy simulation according to claim 1, wherein it comprises a frame provided with means for being coupled to a simulator which in turn comprises a display screen and haptic devices supporting the instrument simulated by rods and introduced in the body of the knee through the corresponding portals.

11. An articulated knee for arthroscopy simulation according to claim 1, wherein it comprises force feedback means for the movements achieved along each of the axes of rotation and traction of the knee and for the movements achieved by the haptic devices introduced through the entry portals.

12. An articulated knee for arthroscopy simulation according to claim 1, wherein the articulation mechanism of the knee of the invention is structured such that the interior of said knee is hollow to prevent mechanical interference with the instrument simulated by rods and supported by the haptic devices.

* * * * *